Patented Dec. 31, 1935

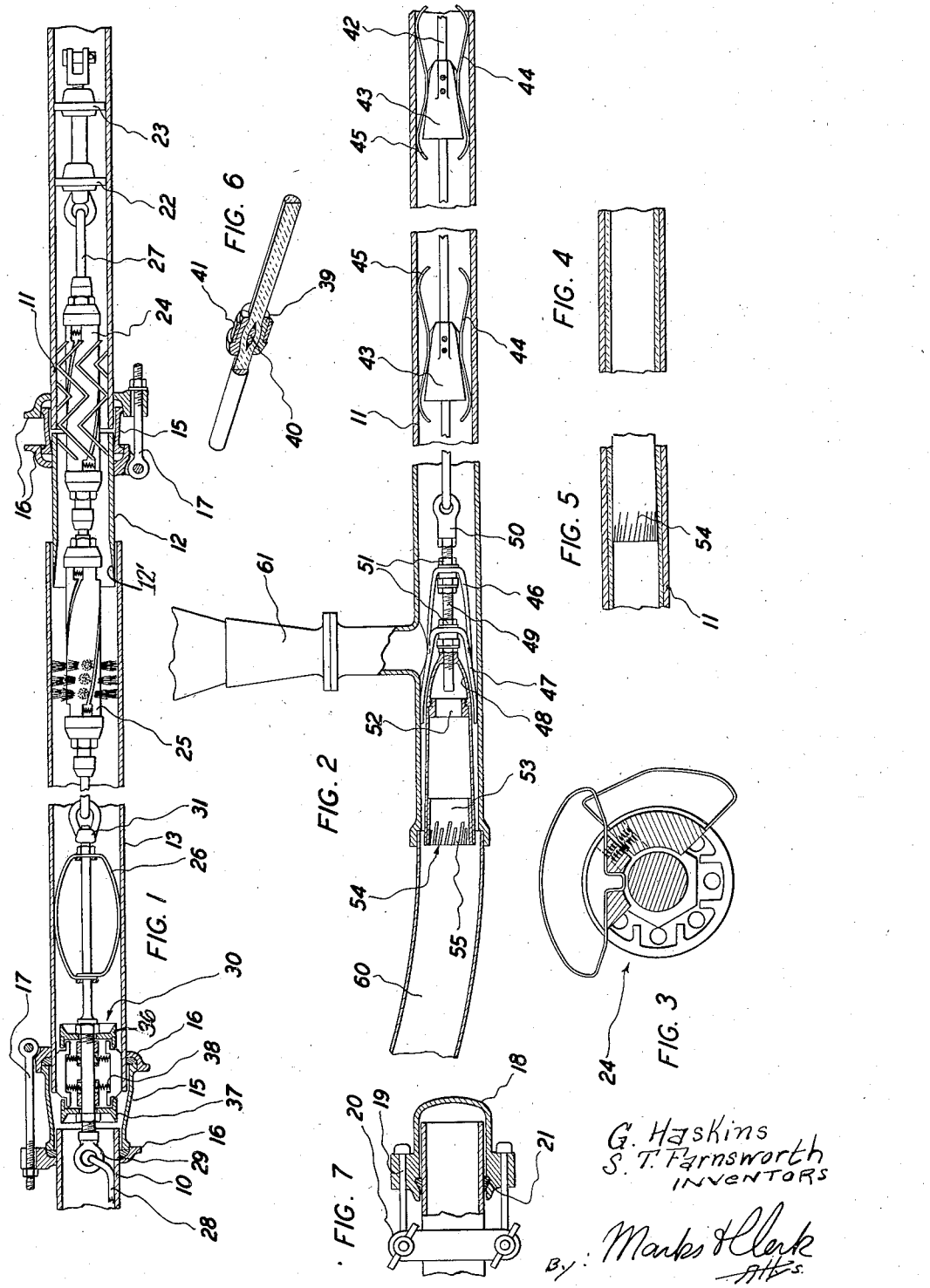

2,026,470

UNITED STATES PATENT OFFICE 2,026,470

APPARATUS FOR LINING PIPES IN SITU WITH CEMENT MORTAR

Gerald Haskins, Wahroonga, near Sydney, New South Wales, and Samuel Thomas Farnsworth, Vaucluse, near Sydney, New South Wales, Australia, assignors to Haskins Patent Pipe Linings Limited, Sydney, Australia, a company of New South Wales Application November 25, 1933, Serial No. 699,794
In Australia November 30, 1932

6 Claims. (Cl. 25—32)

Buried pipe lines in practically all cities are subject to progressive corrosion; expenditures for replacements and cleaning, and diminution in flow capacity of corroded pipes have developed problems of great magnitude to municipal engineers. Consequently, much attention has been concentrated on the problem of reconditioning many thousands of miles of buried pipe lines by lining them with cement mortar while they are in situ. Obviously, a primary essential for any successful process for the cement mortar lining of pipes in situ is that the lining shall be applied with uniformity and certainty, and that it shall be dense and homogeneous and not liable to slump after application, and for economic reasons and reasons of public convenience, it is essential that the method of application shall be such that costly work in making numerous excavations and opening up pipes at short intervals shall be minimized and the cost brought within an acceptable figure; it must be made possible to operate with reasonable rapidity on existing pipe lines, and the work must be accomplished under conditions which permit access to the pipes for insertion of the lining material and operation of the gear at considerable distances apart.

Engineers have, therefore, realized to the full the desirability of lining existing pipes with cement mortar with minimum disturbance and without involving major inconvenience and cost which would counterpoise the advantage resulting from replacing the corroded pipe lines.

Our invention is based on the broad conception of introducing quantities of low slump test cement mortar at convenient distances apart into existing pipe lines after cleaning them, distributing this cement mortar progressively as it is introduced more or less continuously along the lengths of pipe intermediate the access excavations, and then spreading and plastering the thus distributed cement mortar on the pipe surfaces by means of a "projectile" having a flexible metal skirt which is adapted to conform its sectional shape when stressed to the varying sectional shapes of the pipe line. The kernel of our invention is the dual step of first distributing cement mortar along the pipe line so that to every part of the pipe there is brought at least that quantity of cement mortar which is required to produce the lining at that point, and immediately following this distribution of cement mortar along the pipe line, drawing a projectile spreader which has a flexible skirt through the pipe line so as to spread and plaster the thus predistributed cement mortar onto the pipe and compress it thereon to form a compact continuous lining conforming to the pipe section.

The distributor is designed for operating on low slump test cement mortar without risk of blocking the pipe, and it is adapted for distributing the cement mortar more or less uniformly along the length of the pipe between the cement mortar charging places, so that it shall be distributed in the pipe ready to be spread onto the pipe surfaces by the projectile. If access to the pipe can be obtained through hydrants or other vents at intervals of 240 feet or more apart, or even at intervals over 350 feet apart, the projectile following the distributor will apply a firm lining of cement mortar to the pipe between these access stations.

The distributor arrangement consists of a hauling line upon which is fixed a train of conical, bull-nosed, or taper shape plungers at intervals of a few feet apart. These plungers are in diameter considerably less than the minimum section of the pipe, and they operate as a drag conveyor; they are each fitted with long curved centering fingers of spring steel spreading radially from them and extending forward and aft of them. These spring fingers flex and operate to centre the plungers approximately in the pipe. The plungers do not plaster the cement mortar onto the pipe; they distribute it more or less uniformly along the pipe; the plastering is performed by the projectile. The necessary quantity of cement mortar to provide for the lining of the pipe between one filling station and the next is introduced into the pipe gradually, and the distributor is drawn past the filling station through the pipe length about to be lined at a slow rate so that it will drag along the cement mortar as the same is being fed into the pipe and distribute it along the pipe after the manner of a drag conveyor, leaving the cement mortar in a more or less regular trail in the pipe line between the cement filling stations. The spreader projectile is drawn through the pipe line following the distributor and by means of the one hauling line in the same hauling operation. It is most convenient to utilize the same hauling line for operating the distributor and for operating the spreader, the spreader in this case being attached to the hauling line rearward of the train of distributor plungers which are attached to the line.

Preliminarily to the introduction of cement mortar at the respective filling stations, the pipe line ahead must be scraped and cleaned to remove excrescent foreign matter which may be clinging to it or adhere to it. The scraper and cleaner tools are forced through the pipe by water pressure applied behind them and they carry in the hauling line by which subsequently further cleaning and drying appliances and the spreader and the projectile are drawn through the section.

The projectile spreader consists of a projectile shaped hollow body preferably of slow taper shape, constructed of flexible sheet metal with its rear end open and a rigid nose piece at its fore end having means for attaching it to the hauling rope; it is provided with flexible trailing guide fins formed on or attached to the nose piece of the projectile and to the coupling device by which the hauling line is attached to it. The projectile body is held always in a central position in the pipe line by the trailing flexible guide fins. These fins are steel spring spreading members with butts much smaller in diametral measurement than the pipe bore. They are set to bear with a little pressure radially outward against the wall of the pipe, but they are sufficiently flexible to allow them to bend inward to pass irregularities in the pipe section. They form what may be regarded as floating centering leaders and running guides for the projectile. The diametral dimensions of the spreader body at the rear end of it correspond with the finished bore diameter of the desired cement lining. Owing to the lateral flexibility of its skirt portion the projectile will accommodate itself to varying sectional shapes in the pipe line and will conform the cement lining which it plasters onto the pipe surface to the sectional shape of that surface from place to place, so that the lining applied will have approximately equal thickness at all places in the pipe line.

In order to ensure centrality of the projectile in the pipe bore the guide fins associated with the projectile are extended backward over the full length of the projectile nose and beyond the shoulder of the projectile, for a little distance over the leading end of the taper skirt portion of the projectile body. As the guide fins pass through the cement mortar which has been spread along the pipe by the distributor they tend to "carve" it and thereby facilitate the work of the projectile in spreading it onto and plastering it onto the pipe surface. The taper skirt applies gradually increasing compression on the cement lining as the same becomes applied to the pipe.

By means of an apparatus cement mortar having a low slump test may be introduced at very considerable distances apart in the pipe lines, and progressively as it is being introduced, distributed along the pipe lines between the access places at which it is so introduced, and, immediately following the distribution, spread and plastered upon the interior surface of the pipe so as to form a substantially uniform lining therein. Predistribution of the cement mortar and the taper section and flexibility of the projectile body enable the projectile to operate successively with drier cement mortar mixtures than those which can be worked without predistribution and with non-flexible projectiles, with better assurance of permanency in the lining and substantially without risk of slumping which would be practically unavoidable were the cement mortar mixture high in water content.

The open back end of the projectile skirt is bushed with a short length of springy sheet metal tube and it is closely slitted in helical direction with the slits extending through the tubular bush to form tongues or fingers which are individually capable of flexing, the slits giving clearance for the closing together of these tongues or fingers under external compression. The bushing is flexible so that it does not make the back part of the projectile skirt too rigid to pass irregular places on the pipe wall at which if it were rigid it would be caused to wipe from them the lining which has already become plastered on them by the action of the preceding part of the projectile. The slits extend through the back open end of the projectile skirt and through portion of the length of the bushing tube which is fixed within it. The helical or angular disposition of the slits avoids the formation of ribs or lands on the surface of the applied cement lining.

In the accompanying drawing:—

Fig. 1 is a longitudinal section through a pipe line containing the pipe scraping and cleaning tools;

Fig. 2 is a longitudinal section through a pipe line at a cement mortar charging station with the projectile, its guides and the distributor plungers which precede it connected on the hauling line for carrying forward and distributing the cement mortar charge and for spreading and compressing it upon the pipe wall;

Fig. 3 is an end sectional elevation of the scraper tool which is shown in Fig. 1;

Fig. 4 is a fragmentary longitudinal section through an iron pipe lined with cement mortar by means of the apparatus shown in other figures;

Fig. 5 is a fragmentary longitudinal section explanatory of the action of the flexible skirt slitted end taper shape projectile in spreading and compressing the cement mortar onto the pipe wall;

Fig. 6 is a detail sectional view of a stopper for securing tools on the hauling line; and Fig. 7 is a fragmentary sectional view showing a capping device for closing a pipe end for purposes which are explained in the following description.

To permit introduction of the pipe scraping and cleaning tools it is necessary to remove temporarily a section of the pipe at the selected charging station and to introduce a pilot section temporarily in its place; this pilot section is removed when the work is finished and the original section which has meantime been lined is then replaced.

In Fig. 1, 10 and 11 are the neighboring ends of the opened pipe line, the intermediate section having been removed temporarily, and 12—13 is the pilot pipe introduced into the gap between the pipes 10 and 11. The short section 12 of the pilot pipe is reamed at its inner end 13 to offer an easy entry for the cleaning tools and the reamed end is telescoped into the long section 13. The ends of the pilot section 12—13 are coupled to the standing ends 10—11 of the gapped pipe line by sleeves 15 and gasketed end rings 16 which are clamped up by means of bolts 17 so as to form tight joints at the gaskets. When it is necessary to close the opened end of a pipe line in order that the service may be maintained behind the closure, the open end of the pipe is covered with a tubular cap 18 which is clamped home by bolts 19 hung from a clamped-on collar 20, 21 being grommet packings to make the point watertight.

The scraping and cleaning assembly comprises a pair of pistons 22 and 23 of soft vulcanized rubber, a pipe scraper 24 of conventional design certain detail of which is shown in Fig. 3, a wire brush 25, a spring leaf centering guide 26 and a drum scraper 30, all carried on an axial rod or wire rope 27. A hauling line 28 is shackled to the eye 29 at the back end of the drum scraper 30. A rotatable shackle 31 should be introduced between the wire brush 25 and the centering guide 26, as the helical disposition of the wire tufts on the stock results in tendency of the assembly to rotate when it is moved along the pipe.

The scraper drum consists of two flanged heads 36 and 37 of smaller diameter than the pipe section with scraper blades loosely held between them with liberty for movement in radial direction; these blades are backed by springs 38 which influence them in outward direction towards the pipe wall.

Water under pressure is admitted to the pipe rearward of the drum scraper 30. Acting behind the pistons 22 and 23 the water forces the assembly through the pipe, the hauling line 28 being drawn with it. In the event of blockage occurring the assembly can be drawn back to the starting point by means of the hauling line.

The stopper, Fig. 6, is a split cylinder 39 with a check tooth 40 which is adapted to engage between the strands of the cable when the two halves of the cylinder are compressed over the cable by driving the binder ring 41 over the assembly.

In Fig. 2, 42 is the hauling line, carrying on it two distributor plungers 43 (more than two such plungers may be used) and the spreader projectile and the plunger guides and the projectile guides. The plungers 43 are preferably conical in shape with their apex ends leading, and each of them carries four elliptical lead spring guides 44 with re-entrant tips 45. The base diametral measurements of these plungers is substantially smaller than the pipe diameter and the guides extend well forward and also extend rearward of them and bear outwardly against the surface of the pipe.

The projectile is provided with two trailing leaf spring guides 46 and 47, the tails of the forward one 46 overlapping the butt of the rearward one 47 and the tails of the rearward one extending back over the shoulder portion of the projectile body. The nose piece 48 of the projectile is a casting and is quite rigid; it is screwed onto the draught rod 49. A shackle 50 on the fore end of the draught rod forms a connection for attaching the hauling line 42 to the projectile, and the spring guide butts are holed and fixed on this draught rod spaced apart forwardly from the projectile nose, the fixing nuts 51 permitting positional readjustment for best operation.

The body portion of the projectile is a slowly tapered flexible metal tube which is attached to the projectile nose through a heavy shoulder ring 52. At its forward end this body tube is substantially less in diameter than the required finish diameter of the cement lining. At its rear end it is just larger in diameter than the diameter of the finished cement lining. The length dimension is two to three times the diametral measurement. A flexible tube bush 53 is fixed in the skirt of the projectile body to stiffen it without, however, making it rigid, and the skirt is slitted helically or angularly with alternated short and long slits 54 to form tongues 55 which have considerable springiness so that they flex inward and function as floats in passing over the lining of cement mortar which has been plastered onto the pipe wall by the forward part of the projectile. As the tongues are disposed more or less angularly in relation to the line of draught and the slits 54 in the projectile skirt are much narrower than the slits in the tube bush 53, the slits do not form ribs or lands on the face of the cement mortar lining. The spring guides 46 and 47 centre the leading part of the projectile in the pipe, and as they are positioned in advance of the projectile nose, they carve and part the cement which has been spread loosely along the pipe by the distributor plungers 43 and facilitate entry of the projectile into it and minimize risk of blocking. By reason of the gradual increase in diameter of the projectile body from shoulder to skirt, the cement mortar lining applied to the pipe is subjected to progressive compression whereby it is compacted very firmly and voids are destroyed. The back end of the projectile is fully open.

60 is a pilot entry pipe which enters the socket of the end pipe in the line which is being treated, and 61 is a hopper set over a hydrant base 62 or other conveniently positioned branch. The cement mortar is introduced into the pipe through this hopper. The chamber of distributor spreaders is fixed on the hauling line, and their distances apart are determined by experience having regard to the pipe diameter and the length of pipe between access stations. The cement mortar is introduced gradually while the series of distributor spreaders is being drawn past the entry place, so that the cement mortar is drawn along the pipe as it is being filled into it, risk of choking or blocking the pipe being thus obviated.

The projectile nose is paraboloid in shape to facilitate its entry through any mass of cement mortar which may be crowded up against it. The precise sectional shape of it is unimportant; it might be conical, but a shape approximating to paraboloid is most desirable.

What we claim as our invention and desire to secure by Letters Patent is:—

1. Apparatus of the projectile type for applying cement mortar lining to pipes in situ, comprising a train of solid conical cement mortar drags spaced apart along a hauling line, a flexible projectile attached to said line rearwardly of said drags, the diameter of the bases of the mortar drags being substantially less than the diameter of the base of the projector whereby the mortar drags act as distributors and the projectile acts as a spreader and compressor, said projectile being structurally adapted for spreading and compressing onto the pipe surface cement mortar which has been distributed along the pipe by said drags.

2. A projectile for spreading and compressing cement mortar in a pipe to form a lining therein, comprising a rigid nose and rigid shoulder and a slow-taper flexible wall elongate cylindrical body having its back end fully open, a tubular bush fixed within said open end, and trailing fingers formed by slitting through the bush and the skirt portion of said body.

3. A projectile according to claim 2 wherein the slits and the tongues formed in the skirt portion of the bushed body are disposed angularly in relation to the projectile axis.

4. The device as claimed in claim 2 having a plurality of yoke shape trailing flexible guide fingers fixed in tandem overlapping order ahead of the projectile nose, and a draw rod connected to the hauling line with the finger ends of the rearmost of said guides extended back to the projectile shoulder and accommodated in the annular clearance around said shoulder.

5. In combination with a pipe lining projectile and hauling line of the kind hereinbefore referred to, a plurality of forwardly tapered drag plungers of smaller diameter than the projectile having inwardly bowed spring guides and spaced apart and fixed on the hauling line ahead of the projectile nose, said drag plungers adapted for carrying cement mortar forwardly and distributing it along a pipe in advance of the projectile so as thereby to prevent massing and crowding of cement mortar in front of the projectile.

6. In combination with a pipe lining projectile and hauling line of the kind hereinbefore referred to, a plurality of drag plungers of smaller diameter than the projectile and spaced apart and attached to the hauling line ahead of the projectile nose, said drag plungers being forwardly tapered and adapted for carrying cement mortar forwardly and distributing it along a pipe in advance of the projectile so as thereby to prevent massing and crowding of cement mortar in front of the projectile, and elliptical leaf springs with re-entrant ends fixed to said plungers and adapted to bear as shoes flexibly against the pipe surface and maintain the plungers in approximately concentric position in the pipe.

GERALD HASKINS.
SAMUEL THOMAS FARNSWORTH.